(12) United States Patent
van den Reek et al.

(10) Patent No.: US 6,531,227 B1
(45) Date of Patent: Mar. 11, 2003

(54) INTERMEDIATE MEDIUM FOR TRANSFERRING A TONER IMAGE FROM AN IMAGING MEDIUM TO A FINAL RECEIVING MATERIAL

(75) Inventors: Johannes Adrianus van den Reek, Eindhoven (NL); Edgarius Jakobus Hermanus Beers, Venlo (NL); Karel Pieter Daniel van Zeeventer, Venlo (NL)

(73) Assignee: Oce-Technologies B.V., Venlo (NL)

( * ) Notice: Subject to any disclaimer, the term of this patent is extended or adjusted under 35 U.S.C. 154(b) by 168 days.

(21) Appl. No.: 09/612,408

(22) Filed: Jul. 6, 2000

(30) Foreign Application Priority Data

Jul. 9, 1999 (NL) .............................................. 1012551

(51) Int. Cl.[7] .......................... B32B 25/00; B32B 25/02; G03G 15/16
(52) U.S. Cl. .................... 428/411.1; 428/906; 399/297; 399/308; 492/56
(58) Field of Search ........................ 528/422; 525/540; 428/421, 422, 36.8, 36.91, 906, 411.1; 252/500; 399/297, 308; 492/56

(56) References Cited

U.S. PATENT DOCUMENTS

| | | | |
|---|---|---|---|
| 5,378,404 A | * 1/1995 | Han et al. .................... | 252/500 |
| 5,430,073 A | 7/1995 | Van Dijk et al. ............. | 522/66 |
| 5,436,708 A | 7/1995 | Dreyfuss et al. ............. | 355/271 |
| 5,534,581 A | 7/1996 | Ohtani et al. ................ | 524/430 |
| 5,585,903 A | 12/1996 | Mammino et al. .......... | 355/271 |
| 5,629,094 A | 5/1997 | Sakakihara et al. ......... | 428/447 |
| 5,742,889 A | * 4/1998 | Tazelaar et al. ............ | 399/308 |
| 5,978,639 A | * 11/1999 | Masuda et al. ............. | 399/302 |

FOREIGN PATENT DOCUMENTS

| | | |
|---|---|---|
| EP | A1581385 | 2/1994 |
| EP | A1773482 | 5/1997 |
| JP | A1267658 | 10/1989 |
| JP | A4372623 | 12/1992 |
| JP | A-5194733 | 8/1993 |
| JP | A5287198 | 11/1993 |
| NL | C-1001472 | 7/1997 |

\* cited by examiner

*Primary Examiner*—Paul Thibodeau
*Assistant Examiner*—Ramsey Zacharia
(74) *Attorney, Agent, or Firm*—Birch, Stewart, Kolasch & Birch, LLP

(57) ABSTRACT

An intermediate medium for use as a temporary image support in an imaging device, comprising a rubber top layer which contains a rubber and a conductive material and is formed by polymerization of a rubber oil in the presence of the conductive material. As conductive material, the top layer contains an intrinsically conductive polymer so modified that it can be combined with the rubber oil used as the starting material. This results in high miscibility of the polymer in the rubber oil so that the conductivity of the rubber is high. The conductivity of the top layer can thus be adjusted to the correct level while curing of the rubber oil with UV radiation.

18 Claims, 4 Drawing Sheets

INTERMEDIATE MEDIUM FOR TRANSFERRING A TONER IMAGE FROM AN IMAGING MEDIUM TO A FINAL RECEIVING MATERIAL

BACKGROUND OF THE INVENTION

The present invention relates to an intermediate medium with a rubber top layer which contains a conductive material for use as a temporary image support in an imaging device or system. The imaging device uses the intermediate medium of this kind as the temporary image support.

Imaging techniques in which an image is formed on a temporary image support with a rubber top layer, and said image is transferred under pressure, possibly combined with a supply of heat, to a final receiving material, are known in various forms. In one very well known embodiment, a toner powder image is formed on a re-usable imaging element, such as a photoconductive element, a magnetic imaging element or an electrostatic imaging element containing a dielectric image receiving layer, and said toner powder image is transferred under pressure to an intermediate medium as specified above. The toner powder image is heated on the intermediate medium to make the toner powder tacky, whereafter in a second pressure transfer zone the tacky image is transferred and at the same time fixed on a final receiving support. The latter is heated if necessary before being introduced into the pressure transfer zone. After the image transfer in the second pressure transfer zone, an additional fixing step can take place if necessary to provide optimal fixing of the image on the final image receiving support. Also, in addition to or instead of the additional fixing step, other finishing operations can take place, for example, a gloss treatment. After-treatments of this kind are carried out particularly in the case of (multi-)color images.

Other imaging processes in which intermediate media with a rubber top layer can be used, are processes in which liquid ink or melted ink (hot melt ink) directly form an image on the top layer by means of an ink jet print head and the image is then transferred to the final receiving material.

The rubber top layer of the intermediate medium must have good mechanical and chemical permanency and should particularly be insensitive to the (low-melting) substances (waxes, plasticizers, etc.) released from the receiving materials, particularly receiving papers. The rubber must also have a certain electric conductivity to obviate electrostatic charges. Conventional rubbers for forming such a top layer are silicone rubbers and perfluoropolyether rubbers (PFPE-rubbers).

NL-A 1 001 471 proposes an intermediate medium wherein the rubber is a perfluoropolyether (PFPE) rubber. The top layer containing the PFPE-rubber described therein gives high resistance to the transfer of low-melting impurities. A process for the preparation of a PFPE-rubber by curing a lengthened-chain bifunctional PFPE-oil is described. In one embodiment, furnace black is added as a filler and conductive material to the PFPE-oil, whereafter thermal curing is carried out. In addition, a process is described for the preparation of the lengthened-chain PFPE-oils used as starting material, in which process a PFPE-oil having a weight-averaged molecular weight (Mw) in the range from 1500 to 3000 g/mol is reacted with a lengthened-chain agent selected from the group of di-acid chlorides and di-isocyanates.

One disadvantage of the embodiment of NL-A 1 001 471, in which furnace black is contained in the PFPE-rubber-containing top layer, is that the conductivity of the PFPE-rubber cannot be adjusted within a required bandwidth and the PFPE-rubber is therefore not anti-static. Another disadvantage is that the conductivity with furnace black in the antistatic PFPE-rubber is not stable. Deformation of the PFPE-rubber in fact causes the conductive furnace black paths to be broken. Yet another disadvantage is the difficulty of curing with UV radiation a PFPE-oil with which furnace black has been mixed.

In addition, the prior art makes a number of proposals according to which, in addition to furnace black, other conductive materials such as intrinsically conductive polymers, can be included in the top layer.

For example, U.S. Pat. No. 5,629,094 relates to a transfer material support consisting of a substrate and a top layer. The substrate preferably consists of a resin such as a polyester, polycarbonate, polyvinylidene fluoride, Teflon, polyurethane or polyacetate. The top layer contains a polyester resin, a hardened resin and a silicone polymer. This top layer can also contain polycarbonate, polyamide, polyacrylate, polyoxymethylene, polyphenylene oxide, polyphenylene sulphide, polyethylene, polypropylene, polystyrene, a copolymer of ethylene and propylene, a copolymer of styrene and butadiene, and so on. In addition, the top layer or the substrate may contain conductive materials such as metal powder, metal oxides, gas black, graphite, carbon fibers, organic or inorganic electrolytes and intrinsically conductive polymers such as polypyrrole or polyaniline.

U.S. Pat. No. 5,534,581 describes a transfer material support consisting of a copolycarbonate resin and conductive particles. The conductive particles comprise furnace black, metal oxides or intrinsically conductive polymers, such as polyaniline, polythiophene and polyacetylene. The conductive particles are dispersible in high concentration in the copolycarbonate resin.

U.S. Pat. No. 5,430,073 relates to a process for the preparation of intrinsically conductive polymers comprising in situ activation of precursor monomers whereby activated monomers are obtained which polymerize in the presence of a catalyst. Polymerization without activation of the precursor monomers is prevented. The intrinsically conductive polymers can, for example, be formed after mixing the precursor monomers in a polymer matrix. The intrinsically conductive polymers which are prepared with this process comprise polypyrrole, polythiophene and polyfurane which may or may not be substituted and mixtures of two or more of these polymers.

SUMMARY OF THE INVENTION

The object of the present invention is to include an intrinsically conductive polymer as a conductive material in a PFPE or silicone rubber, instead of furnace black, to ensure that a rubber is formed which is antistatic. Intrinsically conductive polymers, however, are insoluble in the rubber oil (PFPE or silicone oil) used as starting material. The present invention thus provides an intrinsically conductive polymer which is so modified that it can be combined with the rubber oil.

Accordingly, the present invention relates to an intermediate medium for use as a temporary image support in an imaging device, as described in the preamble, wherein the conductive material is an intrinsically conductive polymer so modified that it can be combined with the rubber oil.

PFPE-rubber or silicone rubbers can be used as the rubber. The preferred PFPE-rubber is as described inter alia in NL-A 1 001 471.

Conventional polymers, inter alia, as described in U.S. Pat. Nos. 5,629,094; 5,534,581 and 5,430,073, can be used as intrinsically conductive polymer. Examples are polyaniline, polypyrrole, polythiophene. A very suitable polymer is a modified polyaniline. The conductive polymer can be modified in various ways.

For example, a conductive polymer can be used that is doped with a PFPE-carboxylic acid. The PFPE-carboxylic acid preferably has the formula:

F$_3$C[(OCF$_2$—)$_p$—(OCF$_2$CF$_2$—)$_q$]OCF$_2$—COOH where p and q are in the range of 5 to 9. An advantage of such a modified conductive polymer is that a high intrinsic conductivity and good miscibility in a PFPE-oil used as a starting material can be obtained.

Preferably, the polyaniline used is modified by substituting it on the aromatic ring with a PFPE-chain. Particularly preferred is the use of a modified polyaniline which is a copolymer formed by the polymerization of aniline and aniline substituted on the aromatic ring with a PFPE-chain. The PFPE-chain is preferably a linear [(OCF$_2$)$_m$(OCF$_2$C—F$_2$)$_n$] chain where m and n are in the range of 9 to 13. One advantage of such modified polyanilines is that very good miscibility in a PFPE-oil used as a starting material can be obtained.

The homopolymers or copolymers of aniline substituted with a PFPE-chain can be further modified by doping them with a PFPE-carboxylic acid as described hereinbefore. An advantage of such a modified polyaniline is that when it is mixed in a PFPE-oil used as starting material, high conductivity is transferred to the PFPE-rubber.

The PFPE-chains of the homopolymers or copolymers of aniline substituted with a PFPE-chain can be provided with an acrylate group. An advantage of such a modified polyaniline is that when it is combined in a PFPE-rubber via the acrylate group, an accurate, adjustable and stable conductivity of the PFPE-rubber is obtained together with a wide choice with respect to the curing methods.

The process for the preparation of the modified polyaniline according to the present invention comprises the following reaction steps.

First Reaction Step

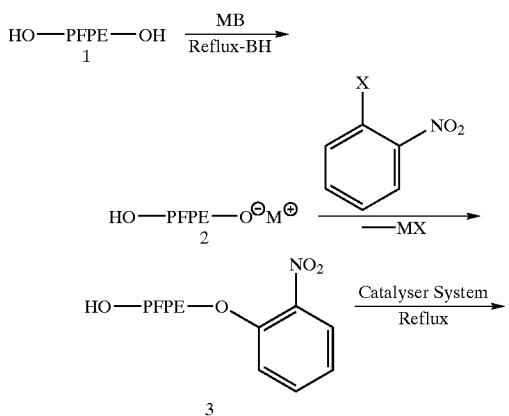

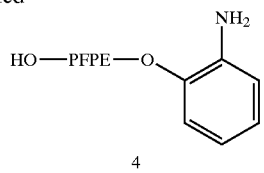

In this reaction step, a fluoridized oil of formula 1 is converted with 0.5 equivalent of a base MB into the salt thereof having the formula 2.

The fluoridized oil used is preferably a fluoridized oil in which in formula 1 PFPE denotes

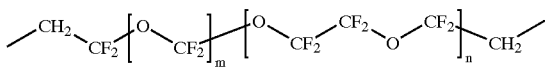

where OCF2 and OCF2CF2 groups are randomly distributed. The base used is preferably an alkali metal oxide, for example potassium tert.butoxide, which yields the alkali metal salt of formula 2. There is no need to use a solvent to perform the reaction, but if required it can be used to bring the viscosity of the reaction mixture to a preferred level. If a solvent is used, it is preferably a non-reactive fluoridized solvent.

The salt of formula 2 is then reacted with nitrobenzene which, on the ortho or meta position, is substituted with a halogen atom X, giving a compound of formula 3. The halogen atom X is preferably a fluorine atom.

The compound of formula 3 is then reduced to a compound of formula 4, with the use of a catalyst system. A preferred catalyst system consists of Fe(II-I)Cl3, carbon and hydrazine hydrate. The solvent used is preferably a non-reactive fluoridized solvent.

The synthesis of compounds of formula 4 is described in T. Hirashime, O. Manare, *Chemistry Letters*, 1975, pages 259–260.

Second Reaction Step

In this reaction step, the formula 4 compound is polymerized to a formula 5 homopolymer by the use of a catalyst system:

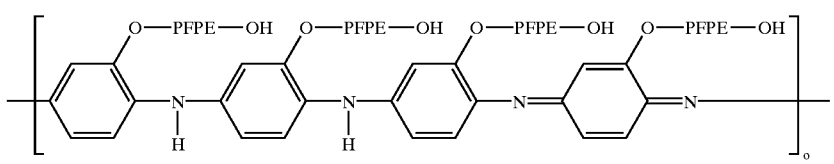

where PFPE has the above-mentioned meaning.

The catalyst system used is preferably a system consisting of 30% hydrochloric acid and ammonium persulphate. The solvent used is preferably a non-reactive fluoridized solvent.

The value of the length of the formula 5 homopolymer shown by o depends greatly on the polymerization conditions used.

The copolymer of PFPE-modified aniline and non-modified aniline can be prepared by adding aniline to the formula 4 compound before polymerization. The resulting copolymer is a random block copolymer of blocks of polyaniline and PFPE-modified polyaniline.

Aniline is not soluble in the formula 4 compound or in a fluoridized solvent.

Consequently, the copolymerization of aniline and the formula 4 compound proceeds via a heterogeneous mechanism, i.e. copolymerization takes place at the interface of the separate phases. In addition, quantum mechanics calculations have shown that aniline is more reactive in the polymerization reaction than the formula 4 compound. Consequently, a polyaniline fraction, a fraction of the formula 5 homopolymer and a copolymer fraction can be formed during the copolymerization reaction.

The copolymerization process can be controlled by varying the concentration and rates of feed of the monomers. The interface between the fluoridized solvent phase and the aqueous phase can be enlarged by stirring. In addition, the length of the various blocks in the copolymer can be controlled by varying the rate of polymerization in the separate phases.

The PFPE-modified homopolymer or copolymer has a higher miscibility in an acrylate-PFPE-oil than a non-modified polyaniline.

which provides electron conductivity in the chain. The maximum and optimal percentage of protonized nitrogen atoms is 50 mol %.

The dopant used is preferably a fluoridized carboxylic acid. It is more preferable to use a fluoridized carboxylic acid in the formula of which $R_1$ denotes

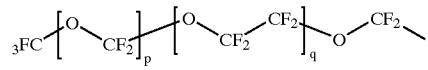

Doping of the copolymer from the second reaction step can be carried out in the same way as for the homopolymer.

Doping is needed to obtain conductivity and an increased miscibility in a PFPE oil of the homopolymer or copolymer. It is assumed that a doped homopolymer or copolymer consists of blocks which conduct satisfactorily, i.e. those in which the nitrogen atoms are protonized, and blocks of less or no conductivity.

Fourth Reaction Step

In this possible reaction step the PFPE chain of the formula 6 homopolymer from the third reaction step is terminated with an acrylate group by means of an alkenoyl chloride with hydrochloric acid being split off, giving a homopolymer of formula 7

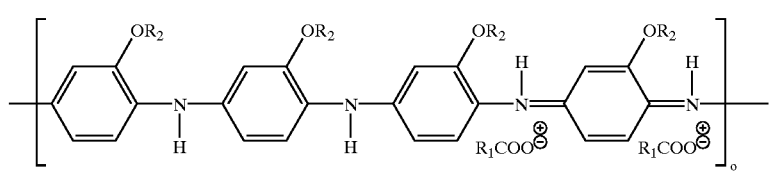

Third Reaction Step

In this reaction step, the formula 5 homopolymer is doped with a dopant having the formula

where $R_1$ denotes a fluoroalkyl group, resulting in a homopolymer of formula 6 where $R_1$ has the above-mentioned meaning and $R_2$ denotes

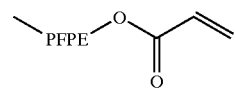

where PFPE has the above-mentioned meaning. Preferably, the alkenoyl halide used is propenoyl chloride.

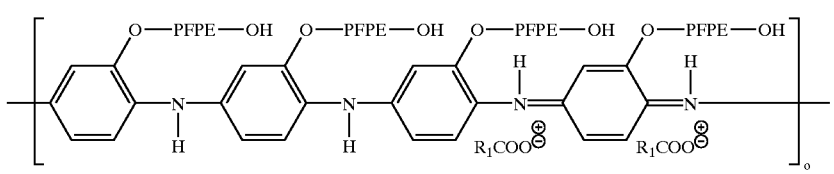

where PFPE has the above-mentioned meaning. The dopant used is an agent which protonizes the basic nitrogen atom of the homopolymer, the anion of the dopant forming an ionogenic bond with the protonized nitrogen atom. The anion produces an electron deficiency in the polymer chain, Termination with an acrylate group of the copolymer from the third reaction step can be carried out in the same way as for the homopolymer.

By termination with an acrylate group the intrinsic conductivity of the homopolymer or copolymer is not changed.

Termination with an acrylate group, however, is needed if it is desirable to combine the homopolymer or copolymer with the PFPE-rubber. By such a combination the homopolymer or copolymer becomes a fixed part of the rubber and an interpenetrating network is formed. This can be desirable, for example, if the R1 and R2 groups form a sol fraction which has adverse effects on the visco-elastic properties of the PFPE-rubber.

It is possible to carry out the termination with an acrylate group in an earlier stage, for example, directly after the polymerization in reaction step 2. It is also possible to perform the termination in a later stage, for example, after the mixing of the homopolymer or copolymer into an acrylate-PFPE oil.

The resulting homopolymer or copolymer is then mixed into a PFPE-oil terminated with acrylate groups (hereinafter referred to as "acrylate-PFPE-oil") having the formula

$$CH_2=CH-(CO)-O-PFPE-O-(CO)-CH=CH_2$$

where PFPE has the above-mentioned meaning. The fluoridized $R_1$-groups and $R_2$-groups of the polymer have a great interaction with the acrylate-PFPE-oil so that the miscibility therein is high.

The mixture of the homopolymer or copolymer and the acrylate-PFPE-oil is then cured. UV-radiation or thermal curing can be applied. Curing is performed in accordance with NL-A 1 001 471, the content of which is incorporated herein by reference. It will be clear that instead of acrylate group termination it is possible to introduce any other reactive group provided said group is sufficiently reactive, under the reaction conditions selected, with respect to reactive groups already present or incorporated in the rubber-oil. Examples of other reactive groups suitable for termination are triethoxy, epoxy, hydroxyl, cyanate and isocyanate groups.

In yet another embodiment of the present invention, the intrinsically conductive polymer of the top layer is a PFPE-carboxylic acid doped, non-modified polyaniline. A polyaniline of this kind is obtained in the manner described above for the third reaction step subject to the condition that polyaniline is used as a polymer.

The PFPE-carboxylic acid doped polyaniline can also be prepared in the following manner. Firstly, aniline is mixed in an acrylate-PFPE-oil and then this mixture is cured as described above, yielding a PFPE-rubber. The aniline present in the PFPE-rubber is then polymerized oxidatively to form polyaniline and doped by immersing the rubber in an acidic oxidator solution with PFPE-carboxylic acid.

BRIEF DESCRIPTION OF THE DRAWINGS

The present invention will now be explained in detail with reference to the drawings, wherein.

DETAILED DESCRIPTION OF THE INVENTION

The construction of the apparatus of the present invention is the construction according to NL-A 1 001 471, the content of which is incorporated herein by reference.

Figure 1:
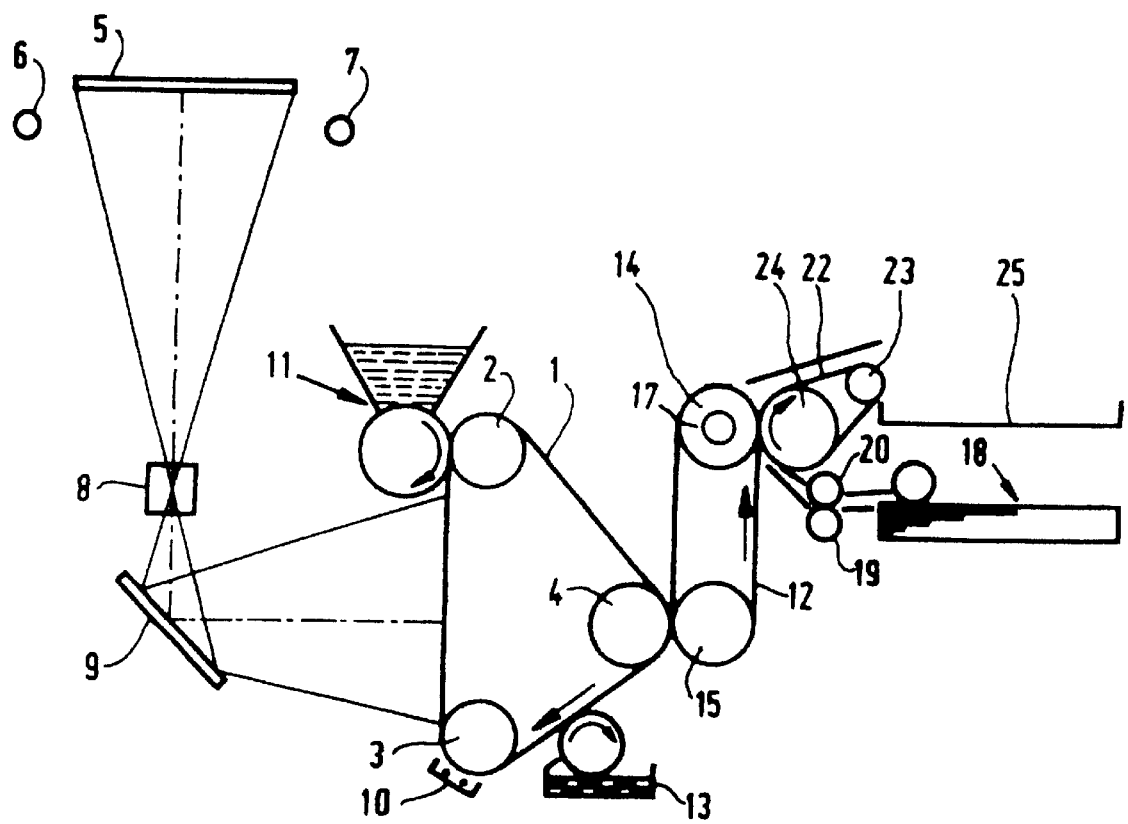
FIG. 1 is a diagrammatic cross-section of one embodiment of the apparatus according to the present invention.

The imaging device illustrated in FIG. 1 is provided with an endless photoconductive belt 1 which is advanced at a uniform speed by means of drive and guide rollers 2, 3 and 4 respectively. The image of an original placed on a window 5 is projected on to the belt 1 by means of flashlights 6 and 7, a lens 8 and a mirror 9, after the belt has been electrostatically charged by a corona device 10. The latent charge image formed on the belt 1 after the flash exposure is developed with toner powder by means of a magnetic brush device 11 to give a toner image that is then brought into contact under pressure with an endless intermediate medium belt 12 in a first transfer zone, said belt 12 being provided with a top layer according to the present invention. The construction of the intermediate medium is further in accordance with EP-A 0 581 365, which is incorporated herein by reference. In these conditions, the toner image is transferred by adhesion forces from the belt 1 to the belt 12.

After this image transfer, any remaining image residues are removed from belt 1 by means of a cleaning device 13, whereafter the photoconductive belt 1 is ready for fresh use.

The intermediate medium belt 12 is conveyed over drive and guide rollers 14 and 15 and is heated to a temperature above the softening temperature of the toner powder, for example by means of an infrared radiator 17 disposed inside roller 14. While belt 12 is advanced with the toner image thereon, the toner image becomes tacky as a result of the heating. In a second transfer zone, the tacky toner image is then transferred, under the influence of pressure, by means of a pressure member in the form of a belt 22 trained over rollers 23 and 24, and at the same time fixed, on a sheet of receiving material fed from reservoir 18 via rollers 19 and 20.

Finally, the copy obtained in this way is deposited in delivery tray 25 by belt 22, which is trained over rollers 23 and 24.

Before being introduced into the second transfer zone, the sheet of receiving material can be preheated in manner known per se in order thus to obtain better image transfer and fixing. Preheating can be effected by means known for this specific purpose. For example, the heating device can consist of a heated flat plate, possibly covered with a thin layer of adhesive material, over which the sheet of receiving material is transported in the best possible contact. Contact with the heated plate can be effected by electrostatic attraction. Suitable embodiments for a sheet transport device with electrostatic attraction against a guide plate, which can be heated to heat the sheet, are described in German Patent Application No. 38 33 302.

Instead of heating the roller 14, when use is made of a transparent or practically transparent intermediate medium belt, the latter can be heated from the inside outwards by means of a radiant heater. The radiant heater is disposed just before the second transfer zone, so that any toner image present on the belt is heated practically directly and very efficiently.

Figure 2:
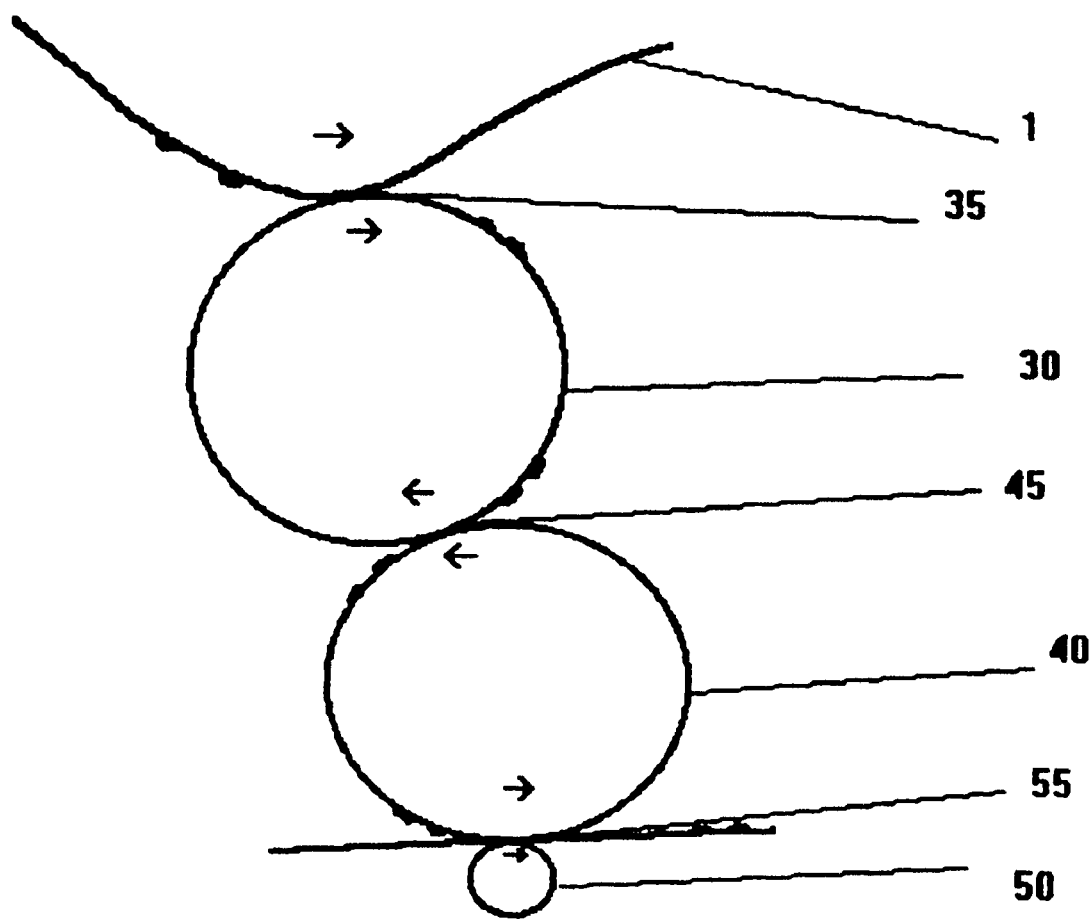
FIG. 2 is a diagrammatic cross-section of another embodiment of the apparatus according to the present invention.

FIG. 2 is a cross-section of the device according to the present invention wherein element 1 denotes the imaging medium and the intermediate medium consists of a first transfer medium 30 and a second transfer medium 40. The transfer media are constructed in the form of metal rolls provided with elastic top layers. A toner image applied to the imaging medium 1 is transferred, in the first transfer zone 35, to the first transfer medium 30. The toner image is then transferred to the second transfer medium 40 in the transfer zone 45. The toner image is then transported to the second transfer zone 55, where the toner image is transferred to a receiving material fed through the nip between the second transfer medium 40 and the pressure member 50. The direction of transport of the toner image is denoted by arrows in the Figure.

The two transfer media 30 and 40 can be provided with a top layer according to the present invention. It is also possible to provide only one of the two transfer media with the top layer according to the present invention. Thus transfer medium 40 can be provided with a top layer according to the present invention while the transfer medium 30 is provided with a conventional silicone rubber containing top layer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

EXAMPLE 1

Synthesis of 1-PFPE-aniline
Synthesis of 1-PFPE-nitrobenzene 10.0 g (14.0 mmol) of a PFPE-oil of formula 1 commercially available from Ausimont S.p.A., Milan, Italy, under the trade name MF402 (molecular weight 1400 mmol/kg), is dissolved in 10 ml of a fluoridized solvent commercially available again from Ausimont, S.p.A., under the trade name Fomblin PFS1 (hereinafter referred to as "PFS-1"-). The mixture obtained in this way is cooled to 0° C. 1.3 g (11.6 mmol) of potassium tert.butoxide is then added in four batches during stirring. After the addition, the reaction mixture is then stirred for 1 hour at 0° C. and then for 4 hours at room temperature. 1.6 g (11 mmol) of 1-fluoronitrobenzene is then added to the reaction mixture, salt formation being observed. After the reaction mixture has been left overnight, it is poured into water and the various layers are separated. Kugelrohr distillation (at 120° C., 2 mbar) yields 1-PFPE-nitro-benzene (8.3 g (10 mmol), yield 85%).

$^1$H-NMR[200 MHz, d-acetonitrile] (ppm): σ 7.82 (1H, ArH(6)-), 7.60 (1H, ArH(4)), 7.20 (2H, ArH(3.5)), 4.63 (2H, —CH2—).

Another example of a PFPE-oil used is a PFPE-oil of formula 1 wherein PFPE has the above-mentioned meaning and n is approximately 11, m approximately 11 and m/n approximately 1, commercially available from Ausimont S.p.A. under the trade name Fluorol-ink D.
Synthesis of 1-PFPE-aniline 8.3 g (10 mmol) of the 1-PFPE-nitrobenzene obtained in the previous step is dissolved in 5 ml PFS1, whereafter 5 mg Fe(III)Cl3 and 0.3 g active carbon were added to the solution thus obtained. The mixture thus obtained was then heated to reflux. After 15 minutes reflux 0.8 g (15 mmol) of hydrazine hydrate was added during a period of 1 hour. After the addition, the reaction mixture was stirred with reflux overnight. The reaction mixture was then filtered to remove the active carbon. Kugelrohr distillation (at 110° C., 1 mbar) yielded 1-PFPE aniline (7 g (9 mmol), yield 90%).

$^1$H-NMR [200 MHz, d-acetonitrile] (ppm): σ 6.83–6.62 (m, 4H, ArH), 4.46 (t, 2H, —CH2—), 4.06 (wide, 2H, —NH2—). ATR-IR (cm$^{-1}$): 1620 (—NH$_2$; deformation), 1591 and 1508 (C=C; valency aromate), 1460 (—CH$_2$—; deformation), 1300–900 (C-F; PFPE), 745 (aromate; 1.2-substitution).

EXAMPLE 2

Synthesis of the Homopolymer of 1-PFPE-aniline, Doping of the Homopolymer With a PFPE Carboxylic Acid and Curing of a Mixture of the Doped Homopolymer and an Acrylate PFPE-oil Experiment 1

0.894 g 1-PFPE-aniline as obtained in Example 1, 1 ml PFS1, 2.0 ml of a PFPE carboxylic acid commercially available from Ausimont S.p.A. under the trade name Galden MF300 (hereinafter referred to as "MF300") and the formula R$_1$COOH where R$_1$ has the above-mentioned meaning wherein p is approximately 7, q approximately 7 and p/q approximately 1, and 0.14 g ammonium persulphate were mixed. This mixture was stirred for 2 hours at 0° C. 1 ml water and 1 ml 0.15 M hydrochloric acid were then added to the mixture. After stirring overnight the reaction mixture has a purple color. After 14 hours' stirring the purple reaction mixture was transferred to a separating funnel to separate the PFS1 phase and the aqueous phase. The dark purple PFS1 phase was transferred to a round bottom flask and the PFS1 was then evaporated, leaving a dark purple liquid residue in the round bottom flask. The NMR and IR values of this residue indicate the MF300 doped homopolymer of 1-PFPE-aniline.

$^1$H-NMR [200 MHz, d-acetonitrile] (ppm): σ 6.88–6.70 (m, 4H, ArH), 4.48 (t, 2H, —CH2—). ATR-IR (cm$^{-1}$): 1660 (Ar=N—Ar; elongation), 1591 and 1508 (C=C; valency aromate), 1460 (—CH$_2$—; deformation); 1300–900 (C-F; PFPE), 745 (aromate; 1,2-substitution).

0.09450 g of the resulting MF300 doped homopolymer of 1-PFPE-aniline was dissolved in 1.2 g acrylate-PFPE-oil (4.4% by weight 1-PFPE-polyaniline and 1.0% by weight polyaniline). The solution was deaerated and cured in a nitrogen atmosphere under an UV lamp, resulting in the formation of a clear brown PFPE-rubber film.

Experiment 2

0.14 g of ammonium persulphate was dissolved in 1.4 ml 0.15 M hydrochloric acid and 1.0 g 1-PFPE-aniline as obtained in Example 1 was dissolved in 1.4 ml of hexafluoro-isopropanol. The ammonium persulphate solution was then slowly added by means of an injection nozzle to the 1-PFPE-aniline solution at 0° C. Polymerization progresses fairly rapidly for after addition of a few drops of APS solution the solution already turns pink. After 2 hours' stirring, the reaction mixture has a purple color. After 2 to 3 hours' stirring the purple reaction mixture was transferred to a separating funnel to separate the hexafluoro-isopropanol phase and the aqueous phase. The dark purple hexafluoro-isopropanol phase was transferred to a round bottom flask and the hexafluoro-isopropanol was then evaporated, leaving a dark red/brown residue in the flask. The NMR and IR values of this residue indicate the homopolymer of 1-PFPE-aniline.

$^1$H-NMR [200 MHz, d-acetonitrile] (ppm): σ 7.29–7.03 (m, 4H, ArH), 4.59 (t, 2H, —CH$_2$—). ATR-IR (cm$^{-1}$): 1660 (—NH—; deformation), 1591 and 1508 (C=C; valency aromate), 1460 (—CH$_2$—; deformation); 1300–900 (C-F; PFPE), 745 (aromate; 1,2-substitution).

Experiment 3

2.66 g ammonium persulphate was dissolved in 26 ml 0.15 M hydrochloric acid and 10.45 g 1-PFPE-aniline as obtained in Example 1 was dissolved in 30 ml of a fluoridized solvent commercially available from the 3M Company, USA, under the trade name Fluorinert FC75 (hereinafter referred to as "Fluorinert"). The Fluorinert solution was cooled to a temperature in the range of −10 to −1° C. by means of an acetone/ice bath. The ammonium persulphate solution was then added slowly in a period of 2 hours with stirring. After the addition, the reaction mixture was stirred for another 2 hours at said temperature and then for 16 hours at room temperature, resulting in a viscous dark brown/purple solution being formed. Polymerization progresses approximately at the same rate as in Experiment 2, hexafluoro-isopropanol being used as solvent instead of Fluorinert. After the addition of water, the solution was transferred to a separating funnel to separate the Fluorinert phase and the aqueous phase. The Fluorinert phase was transferred to a round bottom flask and then the Fluorinert was evaporated on a film evaporator, a very viscous dark brown residue remaining in the flask. The IR values of this residue indicate the homopolymer of 1-PFPE-aniline.

ATR-IR (cm$^{-1}$): 3750–2800 (—OH; $H_2O$), 1660 (Ar=N—Ar; elongation), 1591 and 1508 (C=C; valency aromate), 1460 (—$CH_2$—; deformation); 1300–900 (C-F; PFPE), 745 (aromate; 1,2-substitution).

1.32 g (1.64 mmol monomer units) of the above homopolymer of 1-PFPE-aniline was dissolved in 6.28 g hexafluoro-isopropanol and then 2.02 g (2.4 mmol) MF300 were added to the resulting solution. A large quantity of the hexafluoro-isopropanol in the dark red/brown solution was then evaporated on a film evaporator, a residue remaining. This residue was dissolved in an acrylate-PFPE-oil. The resulting solution was deaerated and cured in a nitrogen atmosphere under an UV lamp. This resulted in a PFPE-rubber forming, on which conductivity measurements were carried out (see Example 3).

EXAMPLE 3

Conductivity Measurements on PFPE-rubber

Figure 3:
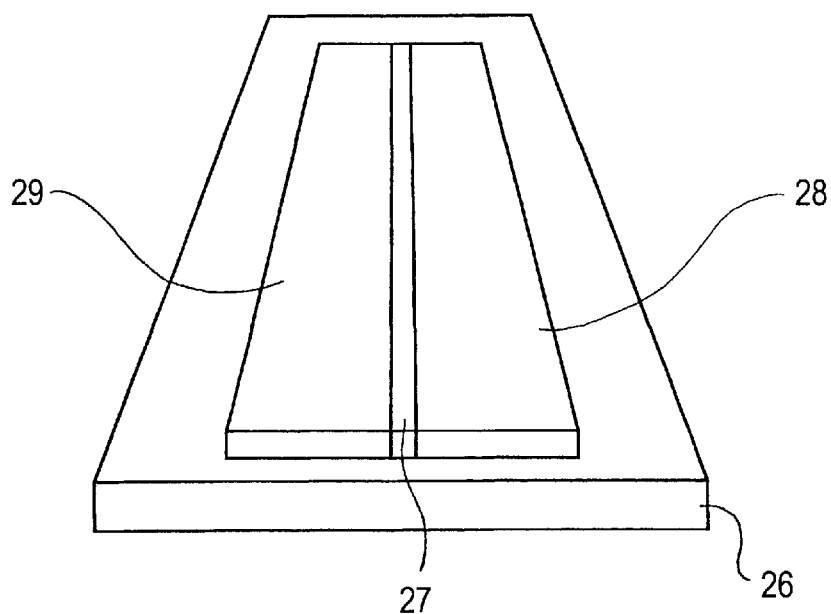
FIG. 3 shows an apparatus for performing conductivity measurements on the PFPE-rubber according to the present invention.

The conductivity measurements can be carried out in a polycarbonate cell 26 as shown in FIG. 3, a mixture of the intrinsically conductive polymer and an acrylate-PFPE-oil being cured in the space 27 between two metal electrodes 28 and 29 with UV radiation to give a PFPE-rubber. A voltage was then applied across the electrodes 28 and 29 and the current measured. The ohmic relationship between the voltage and current was determined at different concentrations of intrinsically conductive polymer in the PFPE-rubber and plotted in a voltage/current curve. The specific resistance of the PFPE-rubber was then determined from the directional coefficient of the voltage/current curve.

Figure 4:
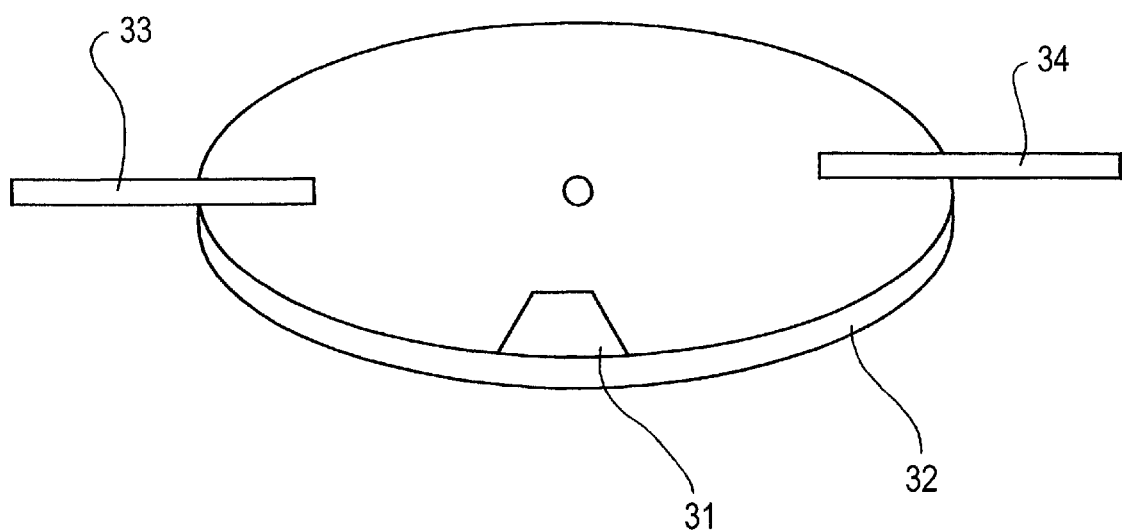
FIG. 4 shows another apparatus for performing conductivity measurements on the PFPE-rubber according to the present invention.

In addition, the conductivity measurements can be carried out with a turntable experiment. A sample of the PFPE-rubber 31 with specific dimensions is placed on a fast rotating conductive circular turntable 32 shown in FIG. 4. The turntable is then charged by means of a corona charger 33, the residual voltage being measured by means of an ASV probe 34 against time.

Figure 5:
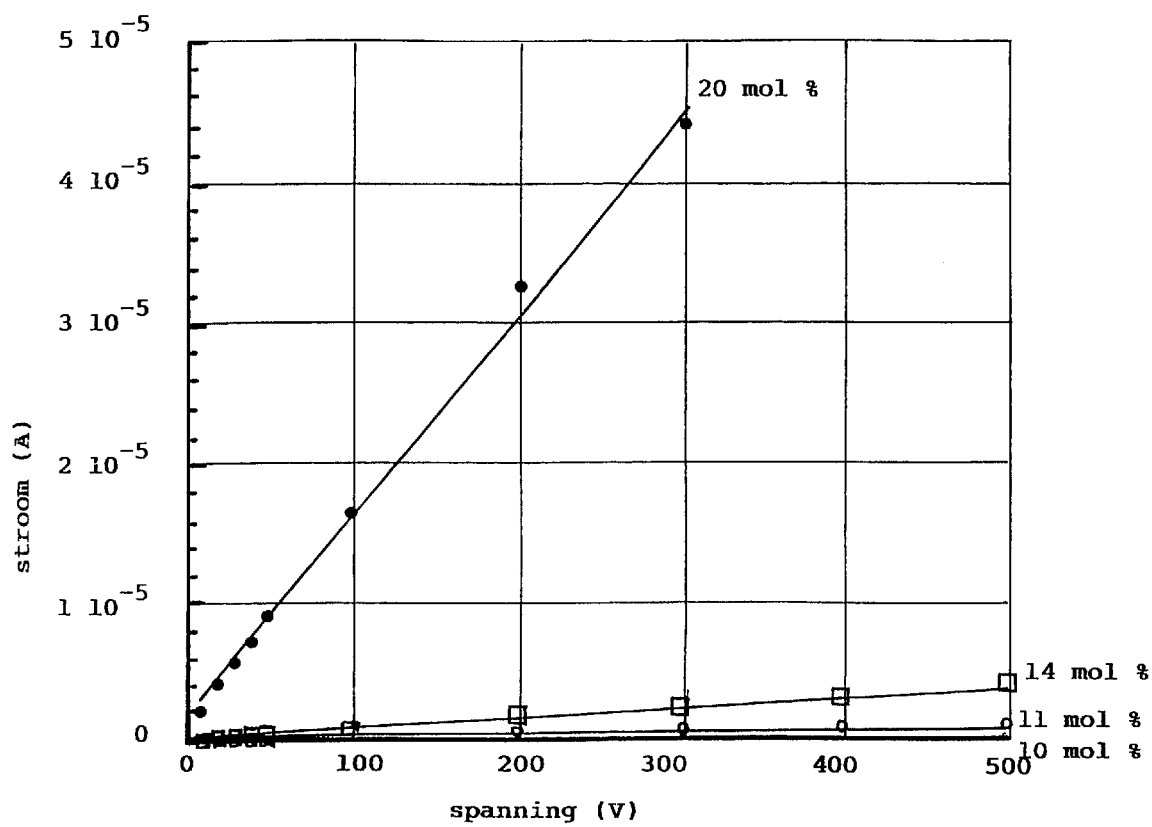
FIG. 5 is a voltage/current curve obtained from conductivity measurements on a PFPE-rubber according to the present invention.

A voltage/current curve obtained with the measuring cell in FIG. 3 is illustrated in FIG. 5 for the PFPE-rubber prepared in Experiment 3 of Example 2.

It will be apparent from FIG. 5 that the specific resistance of the PFPE-rubber decreases with increasing concentration of the intrinsically conductive polymer in the PFPE-rubber. The specific resistance was determined at concentrations of the polymer in the PFPE-rubber in the range from 10 to 20 mol %. At a 20 mol % concentration the conductivity of the PFPE-rubber is at its maximum. The conductivity measurements are reproducible.

EXAMPLE 4

PFPE-rubber With PFPE-doped Copolymers of 1-PFPE-aniline or 1-Acrylate-PFPE-aniline and Aniline A conductivity of the PFPE-rubber was measured as $10^{-7}$ S/cm with the PFPE-doped copolymer of 1-PFPE-aniline and aniline (with a polyaniline impurity of less than 0.5 mol % therein).

The conductivity of the PFPE-rubbers with the PFPE-doped copolymer of 1-acrylate-PFPE-aniline and aniline is accurately adjustable and stable. The top layers containing such rubbers are antistatic. In addition, these rubbers can be obtained with both thermal and UV curing.

EXAMPLE 5

0.02366 g (0.13 mmol monomer units) polyaniline Emeraldine, and 0.1 ml (approximately 0.1 mmol) MF300 were dissolved in PFS1. After 16 hours' stirring a light green solution formed which contained MF300-doped polyaniline.

EXAMPLE 6

A hexafluoro-isopropanol solution was made of polyaniline Emeraldine and MF300 in a round bottom flask. This solution was stirred overnight, whereafter the hexafluoro-isopropanol was distilled off. After this, a residue remained in the flask and was filtered with a filter having a pore size of 0.5 mm. The residue was MF300-doped polyaniline containing less than 50 mol % ionogenically fixed MF300.

The MF300-doped polyaniline was then mixed with an acrylate-PFPE oil. The resulting mixture was cured with UV radiation giving a PFPE-rubber.

Conductivity measurements on the PFPE-rubber obtained in this way show that good results were only obtained if low concentrations of polyaniline were added. At concentrations higher than 1 mol % the miscibility is not good and also curing with UV radiation is impossible.

EXAMPLE 7

Aniline was mixed into an acrylate-PFPE-oil and then this mixture was cured with UV radiation or thermally, with the formation of a PFPE-rubber film. The aniline present in the PFPE-rubber was then oxidatively polymerized to polyaniline and doped by immersing the PFPE-rubber in an acidic oxidator solution with MF300. After some hours there was still no change of color. After 2 days the film acquired a very dark color. In addition, the film felt less elastic than the PFPE-rubber before polymerization. This is due to the fact that the hydrochloric acid of the oxidator solution aftacks the PFPE-rubber.

The resulting PFPE-rubber has a high conductivity because the MF300-doped polyaniline is distributed very homogeneously therein. The disadvantage of this process is that the results are not very reproducible and that the ability to up-scale is low.

Similar modifications to those described above in respect of polyaniline can be carried out on other conductive polymers, such as polypyrroles and polythiophenes. Instead of or in addition to PFPE-rubber, it is possible, as indicated previously, to use silicone rubbers.

What is claimed is:

1. An intermediate medium for use as a temporary image support in an imaging device, said intermediate medium being provided with a rubber top layer which contains conductive material and which is formed by polymerizing rubber oil in the presence of the conductive material, wherein the conductive material comprises a modified intrinsically conductive polyaniline, said modified intrinsically conductive polyaniline being a polyaniline doped with a perfluoropolyether carboxylic acid.

2. The intermediate medium according to claim 1, wherein the rubber is a perfluoropolyether rubber.

3. The intermediate medium according to claim 2, wherein the perfluoropolyether rubber has linear $[(OCF_2)_m (-OCF_2CF_2)_n]$ chains where m and n are between 9 and 13.

4. The intermediate medium according to claim 1, wherein the perfluoropolyether carboxylic acid has the formula

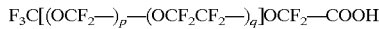

wherein p and q are in the range of 5 to 9.

5. An imaging device comprising, as a temporary image support, an intermediate medium with a rubber top layer which contains conductive material, wherein the intermediate medium contains the composition of claim 1.

6. An intermediate medium for use as a temporary image support in an imaging device, said intermediate medium being provided with a rubber top layer which contains conductive material and which is formed by polymerizing rubber oil in the presence of the conductive material, wherein the conductive material comprises a modified intrinsically conductive polyaniline, said modified intrinsically conductive polyaniline having a perfluoropolyether chain substituted in the aromatic ring.

7. The intermediate medium according to claim 6, wherein the perfluoropolyether chain on the aromatic ring of the modified polyaniline is a linear $(OCF_2)_m-(OCF_2CF_2)_n$ chain where m and n are in the range of 9 to 13.

8. The intermediate medium according to claim 6, wherein the perfluoropolyether chain on the aromatic ring of the modified polyaniline also has an acrylate group.

9. The intermediate medium according to claim 6, wherein the modified polyaniline is also doped with a perfluoropolyether carboxylic acid.

10. The intermediate medium according to claim 9, wherein the perfluoropolyether carboxylic acid has the formula:

wherein p and q are in the range of 5 to 9.

11. The intermediate medium according to claim 6, wherein the rubber is a perfluoropolyether rubber.

12. The intermediate medium according to claim 6, wherein the perfluoropolyether rubber has linear $[(OCF_2)_m (-OCF_2CF_2)_n]$ chains where m and n are between 9 and 13.

13. An imaging device comprising, as a temporary image support, an intermediate medium with a rubber top layer which contains conductive material, wherein the intermediate medium contains the composition of claim 6.

14. An intermediate medium for use as a temporary image support in an imaging device, said intermediate medium being provided with a rubber top layer which contains conductive material and which is formed by polymerizing rubber oil in the presence of the conductive material, wherein the conductive material comprises a modified intrinsically conductive polyaniline, said modified intrinsically conductive polyaniline being a copolymer formed by the polymerization of aniline with aniline having a perfluoropolyether chain substituted in the aromatic ring.

15. The intermediate medium according to claim 14, wherein the perfluoropolyether chain on the aromatic ring of the modified polyaniline is a linear $(OCF_2)_m-(OCF_2CF_2)_n$ chain where m and n are in the range of 9 to 13.

16. The intermediate medium according to claim 14, wherein the perfluoropolyether chain on the aromatic ring of the modified polyaniline also has an acrylate group.

17. The intermediate medium according to claim 14, wherein the rubber is, a perfluoropolyether rubber.

18. An imaging device comprising, as a temporary image support, an intermediate medium with a rubber top layer which contains conductive material, wherein the intermediate medium contains the composition of claim 14.

* * * * *